May 20, 1941. O. E. KOEHLER ET AL 2,242,305
TOOL CHUCK
Filed April 26, 1938
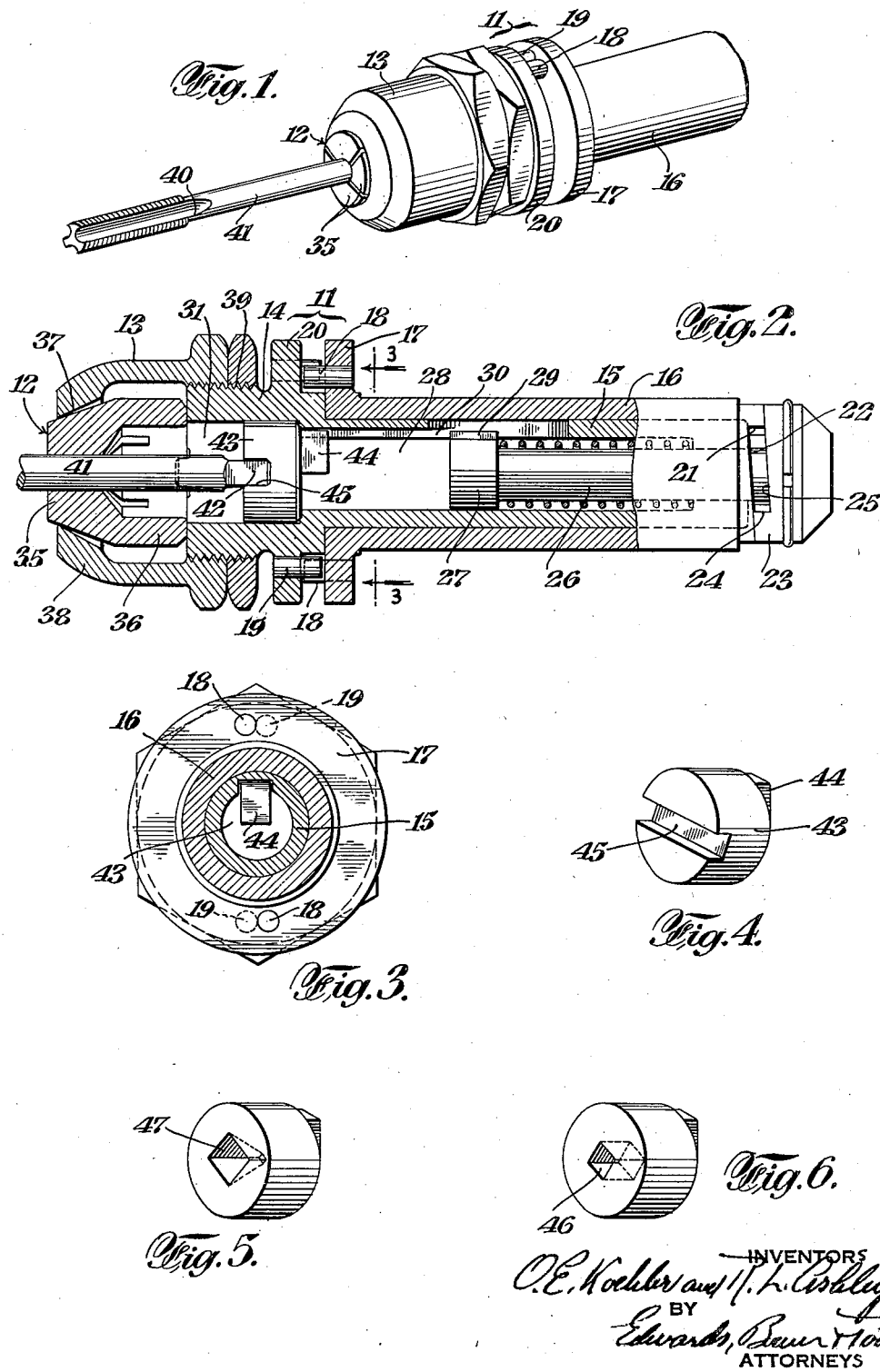
INVENTORS
O. E. Koehler and H. L. Ashley
BY
Edwards, Bauer & Hool
ATTORNEYS Patented May 20, 1941

2,242,305

UNITED STATES PATENT OFFICE 2,242,305

TOOL CHUCK

Oscar E. Koehler and Robert L. Ashley, Greenfield, Mass., assignors to Greenfield Tap and Die Corporation, Greenfield, Mass., a corporation of Massachusetts Application April 26, 1938, Serial No. 204,266

1 Claim. (Cl. 279—49)

This invention relates to improvements in chucks for taps and similar tools having shaped ends adapted to fit into a socket to prevent the tool from turning in the chuck.

A purpose of the invention is to provide a chuck employing interchangeable tapered or acorn type jaw units removably clamped on the body against the tool by a removable cap, and to provide a driving socket engaging the shaped end of the tool shank. Another object is to produce a chuck in which the shank of a tap may be held at a substantial distance from the shaped end thereof. A further purpose is to provide an arrangement of this type that is strong, simple, readily constructed and operated, and which can be made effectively from suitable metals.

Other objects and advantages of the invention including the construction, arrangement and combination of parts will appear from the following description considered in connection with the accompanying drawing, in which, Fig. 1 is a perspective view of a chuck holding a tap;

Fig. 2 is an enlarged longitudinal central section through Fig. 1;

Fig. 3 is a transverse section on line 3—3 of Fig. 2; and

Figs. 4, 5 and 6 are perspective views of various types of socket members.

In the form illustrated the invention is applied to a chuck consisting generally of a body 11, a jaw unit 12 and a cap 13 of the general type construction having heretofore been employed in connection with threading dies and illustrated in the patent to Koehler, No. 1,945,906.

The body 11 as illustrated is of the floating type, and includes a threaded head 14 with a tubular spindle 15 carrying slidable tubular shank 16 having a flanged end 17 provided with driving pins 18 bearing against driving pins 19 on flange 20 of the body 14. The end of shank 16 carries a clutch jaw 21 with a helical face 22 connecting the ends of jaw 21. A cooperating clutch member 23 having a jaw face 24 and a connecting helical face 25 is mounted on the outer end of clutch rod 26 slidably mounted in the outer end of spindle 15 and carries a sliding block 27 fitting in the bore 28 of spindle 15 and having a key lug 29 slidable in keyway 30 extending to the enlarged cylindrical recess 31 in body 14. Spring 32 between rod 26 and spindle 15 engages block 27 and the outer end of said spindle, retaining rod 26, clutch member 23 and shank 16 in normal position with driving pins 18 and 19 in overlapping relationship.

Clutch jaws 21, 23 are positioned, and driving pins 18, 19 are proportioned so that the chuck will be positively driven when shank 16 is engaged in a turret of a screw machine or other operating device, the driving pins 18, 19 permitting sufficient endwise play to allow for differences between tool feed and tap lead. When the desired length of thread is cut the arrest of the forward movement of shank 16 will by continued rotation thereof shift driving pins 19 beyond pins 18, and shank 16 may thereafter be revolved without driving the head 14 and associated parts; but upon reversal of the rotation of the work, clutch faces 21 and 23 will engage and will back off the tap regardless of the relative position of pins 18 and 19.

The jaw unit 12 is of the unitary tapered or acorn type, comprising an annular series of jaws 35 integral with the annular base 36 normally seated on the end of body 14. Jaws 35 are provided with inclined outer faces 37 engaging with a conical surface and are engaged by a corresponding conical bore in cap 38 threaded on body 14 and held in position by lock nut 39.

The chuck is adapted to hold a tool such as a tap 40 having a shank 41, grip jaws 35 and formed with a shaped end 42 which in ordinary taps is square in cross section. A suitable socket for the end 42 is provided to prevent rotation of shank 41 in jaws 35. This is preferably accomplished by employing a socket member which may be removed with the jaw unit 12 to permit the holder and cap to be used with tools having various sizes of shanks and ends. In the convenient arrangement illustrated, a socket member is provided as a separate unit, and is seated in the body 14. In this arrangement a cylindrical socket or driving member 43 fits recess 31 and is seated on the shoulder between said recess and bore 28, being provided with a retaining lug 44 fitting in keyway 30. The parts are preferably proportioned so that the tool end 42 is engaged by the member 43 at a substantial distance from the zone of engagement of shank 41 by jaws 35.

The driving member 43 may be provided with socket recesses or other tool-engaging arrangements of suitable types and contours. For instance, said member may be provided with a transverse slot 45 equaling in width the space between opposite faces of a square tool end 42; a socket 46 fitting said tool end may be located in member 43 in register with the jaw opening; or a tapered socket 47 may be similarly positioned in said member, the tapering walls registering with tool ends 42 of different diameters and permitting employment of the same driving member 43 with tools of different sizes.

While a preferred embodiment has been illustrated together with modifications various other changes may be made within the scope of the invention as set forth in the claim.

We claim:

A tool chuck comprising a tubular body having an annular end surface and a deep central bore with a forwardly facing internal shoulder spaced from said end, a jaw unit comprising a hollow rigid cylindrical portion engaging end to end with the end surface of said body and provided with an opposite tapered portion split into a plurality of flexible jaws forming a generally cylindrical gripping surface spaced outward from the annular end surface of said body, a cap member threaded on said tubular body and engaging the jaws of said jaw unit to compress the jaws into gripping engagement with the shank of the tool and correspondingly shift said unit transversely on the annular end surface of said tubular body, a socket member fitting in the bore of said tubular body and seating against said internal shoulder, means retaining said socket member against rotation, and a socket carried by said member coaxial with said jaw unit and spaced rearward at the end surface of said tubular body and adapted to receive the end of the tool shank gripped by said jaws.

OSCAR E. KOEHLER.
ROBERT L. ASHLEY.